June 2, 1925.
B. F. SEYMOUR
1,540,189
COMBINED TRANSMISSION AND BEARING
Filed Nov. 26, 1923
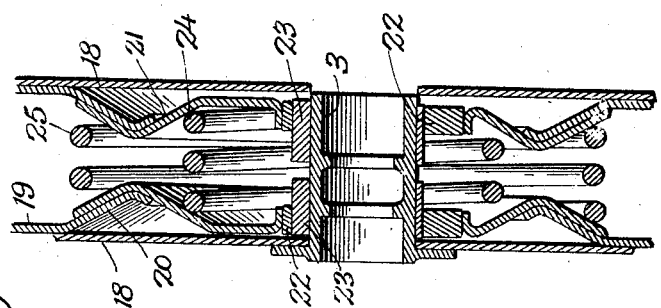
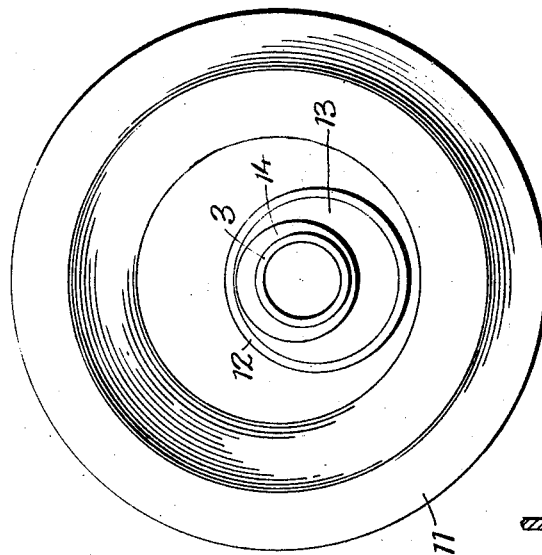
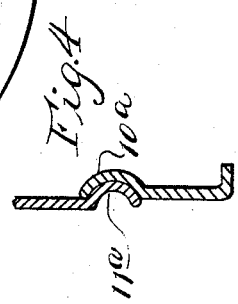
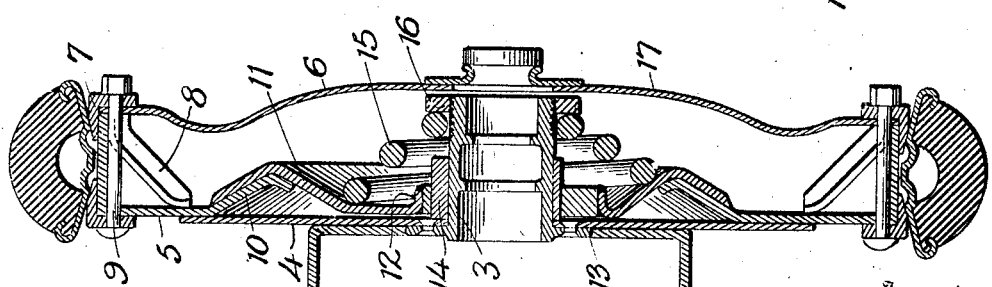
Inventor
Benjamin F. Seymour
By
Attorney Patented June 2, 1925.

1,540,189

UNITED STATES PATENT OFFICE.

BENJAMIN F. SEYMOUR, OF WASHINGTON, DISTRICT OF COLUMBIA.

COMBINED TRANSMISSION AND BEARING.

Application filed November 26, 1923. Serial No. 677,125.

*To all whom it may concern:*

Be it known that I, BENJAMIN F. SEYMOUR, a citizen of the United States, residing at Washington, District of Columbia, have invented certain new and useful Improvements in Combined Transmissions and Bearings, of which the following is a specification.

The present invention relates to resilient transmissions and bearings, more particularly for vehicle wheels, and consists in the combinations and arrangements of elements hereinafter described and particularly set forth in the accompanying claims.

The purpose of the invention is to provide a flexible or resilient transmission between a driving and a driven element adapted to positively transmit the driving force whether said elements are in or out of concentric relation; and one which will readily accommodate itself under all normal working conditions to which said elements may be subjected.

A further purpose of the invention is to provide a combined resilient transmission and bearing for a vehicle wheel to the end that such a wheel may possess the desired resilient qualities and also give the necessary transmission medium between the wheel proper and the motive power of the vehicle.

The construction shown herein is proposed as an improvement or other embodiment of the types of combined resilient transmission and bearing disclosed in my copending applications for United States patents bearing the Serial No. 342,284 Dec. 3, 1919, Serial No. 537,251 Feb. 17, 1922, Serial No. 664,632 Sept. 24, 1923, and Patents Numbered 1,462,385, July 17, 1923; 1,462,386, July 17, 1923; 1,477,908 Dec. 18, 1923; 1,477,909, Dec. 18, 1923; 1,477,910, Dec. 18, 1923; 1,474,122, Nov. 13, 1923; 1,477,911, Dec. 18, 1923; 1,477,912, Dec. 18, 1923; 1,476,187, Dec. 4, 1923.

The construction shown herein is characterized in that the wheel rim is normally supported concentric on the wheel hub by a plurality of eccentric cone and sleeve elements and said eccentric elements are co-operable to effect the necessary resiliency to the wheel as a whole, and for driving the wheel rim through turning of the hub.

The invention is shown by way of illustration in the accompanying drawings wherein:

Figure 1 is a transverse sectional view taken through the wheel.

Fig. 2 is a face view of the wheel with the cover plate removed, and showing the eccentric elements assembled, Fig. 3 is an enlarged transverse sectional view of a modified construction, and Figure 4 shows in fragmentary transverse section a modified form of the eccentric elements.

Referring to the parts in further detail, and wherein like reference characters designate corresponding members, the construction consists of a hub portion 3 having a fixed and disk-like side plate 4 located adjacent the vehicle body (not shown); and 5 and 6 designate, respectively, the inner and outer side plates of the wheel rim 7 which has limited movement relative to the wheel hub. The rim plate 5 is disposed in bearing relation against the hub plate 4 (see Fig. 1), and a number of angular bracing elements 8 are located between the rim plates 5 and 6 in the manner shown. Said bracing elements 8 may be secured in any suitable manner, e. g., by the several bolts 9.

The resilient transmission and bearing device per se consists of an annular male cone element 10 formed on the inner portion of the rim side plate 5, and said cone element 10 is eccentric with respect to the wheel rim. A similar and eccentric female cone element 11 mounted on the wheel hub co-acts with said rim cone element 10 in a manner to be explained. Said cone element 11 is adapted to have lateral movement through the radial movement imparted to the wheel rim as typical of the corresponding elements disclosed in my patents and co-pending applications above referred to. Instead of the cone elements 10 and 11 there may be used complementary and interengaging grooved channeled elements 10ᵃ and 11ᵃ as shown in Figure 4.

The inner portion 12 of the cone element 11 is welded on or may be formed integral with an eccentric collar 13. The eccentric collar 13 is in turn mounted to slide on a similar though wider eccentric collar 14 which is rigidly mounted (e. g., shrunk) on the hub portion 3, to the end that the cone element 11 may have limited sliding movement relative to the wheel hub incident to the limited radial or angular movement imparted to the wheel rim.

The eccentric cone element 11 is held in close contact with the eccentric and rim cone element 10 by the spring 15 and through the tension of this spring said cone elements (10 and 11) are held in cooperative relation.

An adjustable collar 16, screw-threaded on the hub portion 3, serves for regulating the tension of said spring. And the removable rim plate 17 readily permits of access for adjusting said collar and lubricating the working parts, as will be understood.

In the construction shown in Fig. 3 the hub is provided with two side plates 18 which sustain the two rim plates 19, said rim plates having cone elements 20 eccentric with respect to the hub, and cooperable with a pair of similar cone elements 21 mounted on the wheel hub through the eccentric collars 22 and 23, as shown. A pair of springs 24 and 25 normally maintain the eccentric cone elements in cooperative relation. The construction of this type of wheel is otherwise the same as that shown in Figs. 1 and 2, and in like manner the principle of operation is the same.

It will therefore be seen from the foregoing that any motion or shock encountered by the wheel rim will be absorbed in the direction of the axis of the wheel through the co-operable and eccentric cone elements, and this absorption of the shock will be highly flexible or resilient in nature. Whenever forward or reverse motion is imparted to the wheel hub the co-operable cone and eccentric elements will through friction impart turning to the wheel rim with appreciably little or no lost motion, and such transmission will be gradual and resilient.

Another and decided feature of merit of this construction is the saving of the great expense heretofore required for case-hardening the hub, grinding the same, and the avoidance of the necessity for keying the sleeve 14 on the hub.

It will be clear from the foregoing that the construction disclosed and principle of operation thereof adapt the invention to be used as a coupling device or clutch, and it is to be understood here that the invention is not limited to the details of construction shown and described, as these may be varied widely without departing from the spirit of the invention as defined by the claims.

What is claimed as new is:—

1. In a combined resilient transmission and bearing for vehicle wheels, the combination of a hub portion, a wheel rim mounted to have limited relative movement thereon, and cone elements eccentrically arranged co-operable therewith.

2. In a combined resilient transmission and bearing for vehicle wheels, the combination of a hub portion, a wheel rim mounted to have limited relative movement thereon, co-operable cone elements associated with the rim, and an eccentric element interposed between said cone elements and the wheel hub.

3. In a combined resilient transmission and bearing for vehicle wheels, the combination of a hub portion, a wheel rim mounted to have limited relative movement thereon, co-operable cone elements associated with the rim, and co-operable eccentric elements interposed between said cone elements and the wheel hub.

4. In a combined resilient transmission and bearing for vehicle wheels, the combination of a hub portion, a wheel rim mounted to have limited relative movement thereon, and eccentrically arranged and co-operable cone and sleeve elements respectively associated with the wheel rim and the hub.

5. In a combined resilient transmission and bearing for vehicle wheels, the combination of a hub portion, a wheel rim mounted to have limited relative movement thereon, co-operable and eccentric cone elements associated with the rim, and an eccentric member sustaining said cone elements on the hub.

6. In a combined resilient transmission and bearing for vehicle wheels, the combination of a hub portion, a wheel rim mounted to have limited relative movement thereon, an eccentric cone element carried by the rim, an eccentric cone element co-operable with said rim cone element, and an eccentric sleeve sustaining said cone elements on the hub.

7. In a combined resilient transmission and bearing for vehicle wheels, the combination of a hub portion, a wheel rim mounted to have limited relative movement thereon, an eccentric cone element carried by the rim, a laterally movable cone element co-operable with said rim cone element, and an eccentric sleeve sustaining the laterally movable cone element on the hub.

8. In a combined resilient transmission and bearing for vehicle wheels, the combination of a hub portion, a wheel rim mounted to have limited relative movement thereon, and provided with an annular cone portion; an eccentric and annular cone portion co-operable with the rim cone portion, and eccentric sleeves mounted on the hub sustaining said cone portions and the wheel rim.

9. In a combined resilient transmission and bearing for vehicle wheels the combination of a hub portion having a sustaining side plate, a wheel rim mounted to have limited relative movement thereon, said rim having an eccentric cone portion in bearing relation to the hub side plate; an eccentric cone element associated with said rim cone portion, and eccentric sleeve portions sustaining said cone elements on the hub.

10. In a combined resilient transmission and bearing for vehicle wheels, the combination of a hub portion, a wheel rim mounted to have limited relative movement thereon, eccentric sleeve and cone elements angularly disposed to support the rim concentrically on the hub, and resilient means holding said elements in supporting relation.

11. In a resilient transmission, the combination of, a male and a female driving and driven annuli, an impelling element eccentric thereto, and resilient means holding said elements in assembled and resilient relation.

12. In a resilient transmission and bearing for vehicle wheels, the combination of a male and a female driving and driven annuli, said driven annulus constructed to support a wheel rim; an impelling element mounted eccentric thereto, and resilient means holding said elements in assembled and resilient relation.

In testimony whereof I affix my signature.

BENJAMIN F. SEYMOUR.